US012686787B2

(12) United States Patent
Derks et al.

(10) Patent No.: US 12,686,787 B2
(45) Date of Patent: Jul. 21, 2026

(54) BIODEGRADABLE AND/OR COMPOSTABLE BIOBASED POWDERS FOR ADDITIVE MANUFACTURING, AND METHODS FOR THE USE THEREOF

(71) Applicant: Stratasys, Inc., Minnetonka, MN (US)

(72) Inventors: Franciscus Johannes Marie Derks, Geleen (NL); Stijn Witters, Geleen (NL); Joseph Petronella Friederichs, Geleen (NL); Ruud De Groot, Geleen (NL)

(73) Assignee: Stratasys, Inc., Minnetonka, MN (US)

( * ) Notice: Subject to any disclaimer, the term of this patent is extended or adjusted under 35 U.S.C. 154(b) by 183 days.

(21) Appl. No.: 18/568,336

(22) PCT Filed: Jun. 8, 2022

(86) PCT No.: PCT/EP2022/065574
§ 371 (c)(1),
(2) Date: Dec. 8, 2023

(87) PCT Pub. No.: WO2022/258698
PCT Pub. Date: Dec. 15, 2022

(65) Prior Publication Data

US 2024/0294796 A1 Sep. 5, 2024

(30) Foreign Application Priority Data

Jun. 11, 2021 (EP) .................................... 21179131

(51) Int. Cl.
*C09D 167/04* (2006.01)
*B29C 64/165* (2017.01)
(Continued)

(52) U.S. Cl.
CPC ............ *C09D 167/04* (2013.01); *B33Y 70/00* (2014.12); *C08G 63/06* (2013.01); *C08K 3/04* (2013.01);
(Continued)

(58) Field of Classification Search
CPC ...... C09D 167/04; C09D 5/031; C09D 5/037; C09D 7/61; B33Y 70/00; B33Y 10/00;
(Continued)

(56) References Cited

U.S. PATENT DOCUMENTS

2019/0375149 A1* 12/2019 Limem .................. A61L 27/14
2021/0115249 A1 4/2021 Chen et al.
(Continued)

FOREIGN PATENT DOCUMENTS

| | | | |
|---|---|---|---|
| BR | PI1003549 | A2 | 1/2013 |
| WO | 2019043137 | A1 | 3/2019 |
| WO | 2020085912 | A1 | 4/2020 |

OTHER PUBLICATIONS

Oliveira, Marcelo Fernandes De; Silva, Jorge Vicente Lopes Da; BR PI 1 003 549 A2 (CT De Tecnologia Da Informacco Renato Archer [BR]) Jan. 15, 2013, English Machine Translation obtained Sep. 9, 2025. (Year: 2025).*
(Continued)

*Primary Examiner* — Michael M. Robinson
(74) *Attorney, Agent, or Firm* — Faegre Drinker Biddle & Reath LLP

(57) ABSTRACT

The present invention is directed to certain biodegradable and/or compostable biobased particulate compositions for additive manufacturing, such as those including a polyhydroxyalkanoate (PHA) powder, wherein the particulate composition and/or the PHA powder possesses (a) a free bulk density, as determined by ASTM D1895-96, of greater than 0.30 g/mL, and (b) a sinterability region of greater than 15
(Continued)

degrees Celsius. Also, the invention is directed to certain methods of manufacturing such biodegradable and/or compostable biobased particulate compositions useful as powdered build material for additive manufacturing processes. In addition, the present invention is directed to additive manufacturing processes utilizing the biodegradable and/or compostable biobased particulate compositions elsewhere described, along with the articles printed therefrom.

23 Claims, 1 Drawing Sheet

(51) Int. Cl.

| | |
|---|---|
| ***B29C 64/314*** | (2017.01) |
| ***B29K 67/00*** | (2006.01) |
| ***B29K 105/00*** | (2006.01) |
| ***B29K 105/16*** | (2006.01) |
| ***B33Y 10/00*** | (2015.01) |
| ***B33Y 40/10*** | (2020.01) |
| ***B33Y 70/00*** | (2020.01) |
| ***C08G 63/06*** | (2006.01) |
| ***C08K 3/04*** | (2006.01) |
| ***C08K 3/36*** | (2006.01) |
| ***C09D 5/03*** | (2006.01) |
| ***C09D 7/61*** | (2018.01) |

(52) U.S. Cl.
CPC ................ *C08K 3/36* (2013.01); *C09D 5/031* (2013.01); *C09D 5/037* (2013.01); *C09D 7/61* (2018.01); *B29C 64/165* (2017.08); *B29C 64/314* (2017.08); *B29K 2067/00* (2013.01); *B29K 2105/16* (2013.01); *B29K 2105/251* (2013.01); *B29K 2995/0012* (2013.01); *B29K 2995/0041* (2013.01); *B29K 2995/006* (2013.01); *B29K 2995/0063* (2013.01); *B29K 2995/0088* (2013.01); *B29K 2995/0094* (2013.01); *B33Y 10/00* (2014.12); *B33Y 40/10* (2020.01)

(58) Field of Classification Search
CPC .......... B33Y 40/10; C08G 63/06; C08K 3/04; C08K 3/36; B29C 64/165; B29C 64/314; B29C 64/153; B29K 2067/00; B29K 2105/16; B29K 2105/251; B29K 2995/0012; B29K 2995/0041; B29K 2995/006; B29K 2995/0063; B29K 2995/0088; B29K 2995/0094; B29B 13/021; C08J 2367/04; C08J 3/12; C08L 67/04; C08L 2201/06
See application file for complete search history.

(56) References Cited

U.S. PATENT DOCUMENTS

| | | | | |
|---|---|---|---|---|
| 2021/0130608 | A1 * | 5/2021 | Gentsch | C08J 3/14 |
| 2022/0048244 | A1 * | 2/2022 | Van Benthem | B29C 64/165 |

OTHER PUBLICATIONS

International Search Report, ISA/EP, PCT/EP2022/065574, Sep. 19, 2022, 3 pages.
Pereira Tatiana F. et al, “3D Printing of Poly (3-hydroxybutyrate) Porous Structures Using Selective Laser Sintering,” Macromolecular Symposia, vol. 319, No. 1, Oct. 22, 2012, pp. 64-73.

* cited by examiner

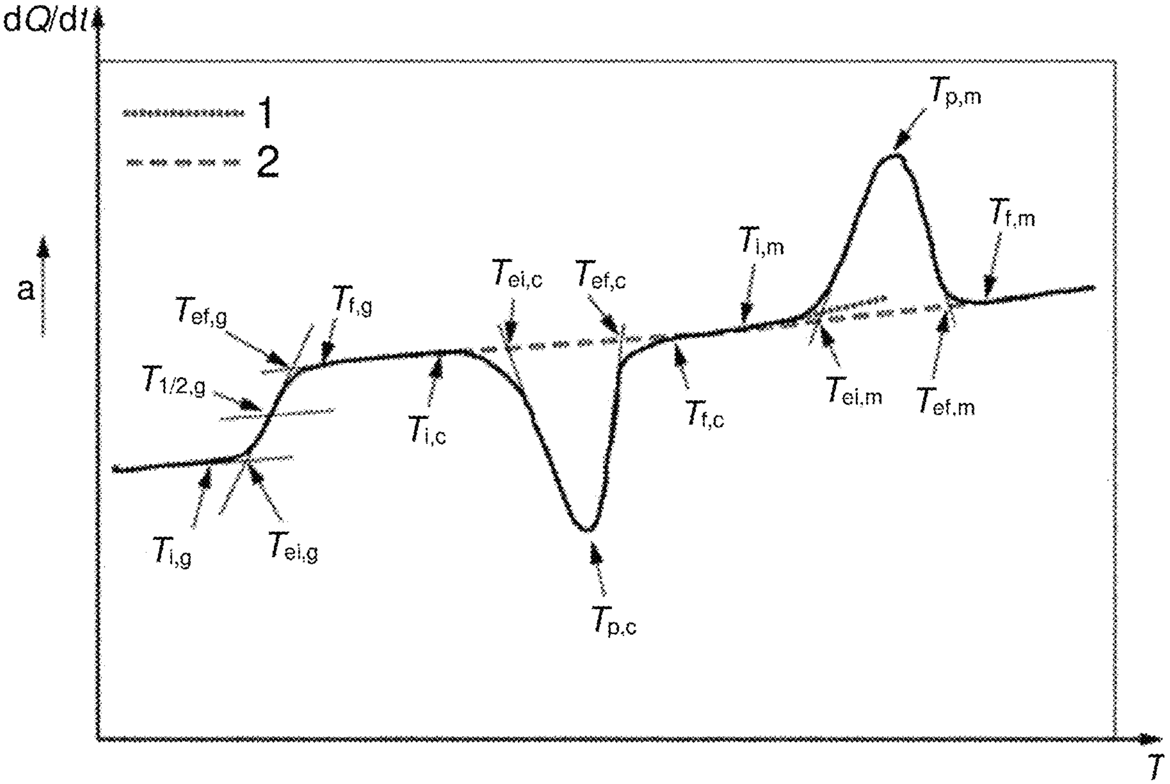
dQ/dt
1
2
a
T
$T_{p,m}$
$T_{f,m}$
$T_{i,m}$
$T_{ei,c}$
$T_{ef,c}$
$T_{ef,g}$
$T_{f,g}$
$T_{1/2,g}$
$T_{i,c}$
$T_{f,c}$
$T_{ei,m}$
$T_{ef,m}$
$T_{i,g}$
$T_{ei,g}$
$T_{p,c}$

BIODEGRADABLE AND/OR COMPOSTABLE BIOBASED POWDERS FOR ADDITIVE MANUFACTURING, AND METHODS FOR THE USE THEREOF

CROSS-REFERENCE TO RELATED APPLICATIONS

This application is a U.S. National Phase of International Application No. PCT/EP2022/065574, filed Jun. 8, 2022, which claims priority to and the benefit of European patent application 21179131.4, filed on Jun. 11, 2021, the disclosures of which are incorporated herein by reference in their entirety.

TECHNICAL FIELD

The invention relates to certain biodegradable, biobased powders for 3D printing, their use in 3D printing processes, and processes for the manufacture thereof. Further, the present invention relates to compositions containing the certain biodegradable biobased powders, to the 3D printed articles produced therefrom, and methods of manufacturing 3D printed articles with the compositions containing the certain biodegradable biobased powders.

CROSS REFERENCE TO RELATED APPLICATIONS

This application claims the priority of the European patent application 21179131.4, filed on Jun. 11, 2021, which is incorporated herein by reference.

BACKGROUND

A variety of additive manufacturing processes are known and used. One subset of such processes which utilizes powder as the build medium is particularly useful for several end-use applications. Such powder-based additive manufacturing processes include Selective Laser Sintering (SLS), High Speed Sintering (HSS), or MultiJet Fusion (MJF). There are known variations between such processes, but powder-based additive manufacturing methods all generally involve the application of a high density, high energy source of radiation, such as a laser, to selectively melt or fuse a portion of particles into a desired shape. A control mechanism serves to direct both the path and intensity of the laser in order to fuse powder disposed within specified boundaries, often on a layerwise basis. Each layer, or "slice," represents a cross-section of the final component to be fabricated at a specified thickness. Machine controls operate selectively to sinter sequential layers of powder, producing a completed part comprising a plurality of slices sintered together. Preferably, the machine control mechanism is computer-directed, and utilizes CAD files of varying formats to determine the defined boundaries for each slice.

The part may be produced by depositing a first portion of sinterable powder onto a target surface of a part bed, scanning the directed laser over the target surface, and sintering a first layer of the first portion of powder on the target surface to form the first slice. The powder is thus sintered by operating the directed laser beam within the boundaries defining the first slice, with sufficient energy, or fluence, to sinter the powder. The first slice corresponds to a first cross-sectional region of the part.

A second portion of powder may then be deposited onto the surface of the part bed and that of the first sintered slice lying thereon, and the directed laser beam scanned over the powder overlying the first sintered slice. A second layer of the second portion of powder is thus sintered by operating the laser beam within the boundaries which then define the second slice. The second sintered slice is formed at a temperature sufficient to sinter it to the first slice, with the two slices fusing together into a single portion of the object to be built. Successive layers of powder are deposited onto the previously sintered slices, with each layer being sintered in turn to form an additional slice.

A wide variety of materials may be used in powder-based additive fabrication process. Many thermoplastics, metals or ceramics are commonly used. Thermoplastic powders are preferred because they facilitate the creation of three-dimensional components with a wide variety of properties that may be suitable for a large array of end-use applications. Preferred polymeric powders include semi-crystalline thermoplastics because of their improved sinterability when compared to more crystalline thermoplastic materials.

Among thermoplastic polymer types possibly used in powder-based additive manufacturing processes include polyolefins, polyarylketones, polyamides, polyimides, polyesters, polyphenylene sulfides, polyarylketones, liquid crystal polymers, polyacetals, and fluorochemical resins.

Currently, the most common class of thermoplastics available for additive manufacturing includes polyamides. Two of the most well-known polyamides are poly(hexamethylene adipamide) (PA66 or Nylon 6,6) and polycaprolactam (PA6 or Nylon 6). Both PA6 (CAS #25038-54-4) and PA66 (CAS #32131-17-2) have excellent mechanical properties including high tensile strength, toughness, flexibility, resilience, and low creep. They are easy to dye and exhibit excellent resistance to wear due to a low coefficient of friction (self-lubricating). Nylons typically possess a high melting temperature and glass transition temperature, thereby enabling the solid polymers formed therefrom to possess superior mechanical properties even at increased temperatures.

Additionally, certain polyesters are also known and described. Polyesters provide certain advantages which could be useful for several end-use applications. For example, Nylons, such as Nylon 6,12, do not readily facilitate the compounding of certain additives, such as flame retardants. Rather, such additives must be added to various Nylons via so-called "dry blends." Polyesters can facilitate the compounding of such additives more easily. Further, polyesters generally exhibit lower moisture uptake than comparable polyamides. Additionally, polyesters offer sustainability advantages over other plastics. In addition to the fact that many polyesters are biodegradable or at least compostable, the means and infrastructure for recycling of polyesters exceeds that of virtually all other thermoplastic materials, so they offer a more readily circular solution. Polyester powders for additive fabrication are described in WO2020085912, which was originally assigned to DSM IP Assets B.V.

Given the increasing use of plastics globally, there exists a strong and growing demand to provide more sustainable solutions. Preliminarily, additive manufacturing techniques facilitate this, as their relatively complex production method offers an enhanced degree of customization and ultimately less waste than traditional manufacturing techniques. Furthermore, as stated, several plastics are readily recyclable, which facilitates multiple functional uses from a given unit of starting material. Yet further, increasingly manufacturers are providing thermoplastic materials from bio-based, rather than petroleum-based, sources. "Bio-based" signifies that a material is synthesized in whole or part from biological origins, such as plants, animals, or micro-organisms.

In addition to the aforementioned approaches, it would also be desirable to increase the utilization of biodegradable or at least compostable plastics. As is widely known, most plastics in use today do not readily degrade or decompose at the conclusion of their useful life, and they are typically disposed of either by incineration or deposition in landfills. Unfortunately, many spent plastics are also increasingly entering the planet's waterways and oceans. Aside from being unsightly, this plastic build-up has a detrimental impact on certain marine life. Thus, it would be especially desirable to source and utilize more plastics that are "biodegradable"—that is, those which may be readily decomposed by living organisms into natural byproducts such as water, carbon dioxide, and biomass.

Many types of biodegradable plastics are known. Biodegradable plastics may originate from bio-based or petroleum-based sources. From a sustainability standpoint, bio-based plastics are typically preferred. Bio-based, biodegradable plastics include polyhydroxyalkanoates (PHAs), polylactic acids (PLAs), blends of starches with other biodegradable plasticizers, and cellulose-based plastics such as certain cellulose esters.

Some attempts at the provision of certain biodegradable, bio-based plastics for 3D printing have been made. US 2019/375149A1, assigned to Tepha Inc., relates to methods to fabricate objects by 3D printing of poly-4-hydroxybutyrate (P4HB) and copolymers thereof. In one method, these objects are produced by continuous fused filament fabrication using an apparatus and conditions that overcome the problems of poor feeding of the filament resulting from the low softening temperature of the filament and heat creep along the fed filament. Methods using an apparatus including a heat sink, a melt tube, a heating block and nozzle, and a transition zone between the heat sink and heating block, with the melt tube extending through the heat sink, transition zone, and heat block to the nozzle are disclosed. 3D objects are also printed by fused pellet deposition (FPD), melt extrusion deposition (MED), selective laser melting (SLM), printing of slurries and solutions using a coagulation bath, and printing using a binding solution and polymer granules.

BRPI1003549A2, assigned to Ct de Tecnologia Da Informacco Renato Archer, describes a solution for the provision of fluffy poly(3-hydroxybutyrate) (P3HB) for scaffolding of implants and/or prototypes.

WO2019/043137A1, assigned to Evonik Rohm Gmbh, is directed to biocompatible polymeric powders (with examples based on polylactic acid (PLLA), poylactic acid polycaprolactone (PCL), and polycaprolactone (PCL)) to be used for 3D printing applications. More specifically, the 3D printing process shall allow a tool less manufacturing of medical devices in particular in the implantable or regenerative space. Its flow and other processing characteristics shall qualify them for the use in selective laser sintering, but also shall be suitable for other powder based 3D printing technologies.

Most known biodegradable, biobased polymers, such as PHAs and PHBs, are known to crystallize relatively quickly from melt compared to other known polymers, such as polyamides. Although this characteristic might be advantageous in injection molding applications due to the resultant shorter cycle times, lower mold temperatures, and superior dimensional stability, it makes processability in laser sintering applications more difficult. This is because the viable operating window of an additive manufacturing process is correlated to the gap between melting and crystallization of the particular material processed. Thus, small deltas between melting and crystallization cause small viable operating windows, making an effective additive manufacturing process difficult or potentially impossible to achieve. In SLS processes, for example, cooler layers of fresh powder are deposited onto a recently-sintered warmer layer. If the gap between the sintered material's melting temperature and crystallization temperature were too narrow, the cooler fresh powder could induce a temperature drop to a point below that material's crystallization temperature. This could result in deformation, curling, or warpage of the portions that were cooled too quickly, and it could further result in a part without appropriate density or part uniformity.

In addition, due to inherent limitations in the three-dimensional printing process, a significant part of the polymer powder is not transformed into the desired shape. This remaining polymer powder (including waste, failed shapes, agglomerated particles, and flushed powder) has typically been exposed to high temperatures, oxygen, contaminants, and/or processing fluids for prolonged periods of time. As a result of such exposure, the powder will degrade affecting the melting characteristics, for example. Thus, even after regrinding, materials, especially those with a narrow sinterability region to begin with, cannot be used reliably in the MJF, HSS, or SLS printing processes again.

Existing PHAs for additive manufacturing further do not offer sufficient processability/reusability, because they do not flow appropriately due to particle size variations and/or they are not formed so as to offer a sufficient gap between melting temperature and crystallization temperature.

It would be desirable to provide a powder for additive manufacturing processes that enables the utilization of the benefits of biodegradable (or compostable), biobased materials such as PHAs. Alternatively or additionally, it would be beneficial to be provide such powders having higher larger "regions of sinterability," that is the difference between the polymer's melting point onset temperature and its crystallization onset temperature, to improve suitability for use in 3D printing processes.

Thus, despite the foregoing attempts, heretofore an unmet need exists to provide certain biodegradable (or compostable), biobased polymer powders, especially certain polyhydroxyalkanoates, for use in additive manufacturing applications that offer improved usability and/or performance, such as via improved printability, flowability, and/or mechanical properties of the objects created therefrom.

BRIEF SUMMARY

A first aspect of the present invention is directed to a method of manufacturing a particulate composition useful as a powdered build material for additive manufacturing sintering processes comprising the steps of: (a) providing a starting material comprising a homopolymer or copolymer of 3-hydroxy butyric acid; (b) optionally, compacting the starting material with a compacting pressure of >40 kN thereby obtaining a compacted material; (c) heating the starting material of step (a) or the compacted material of step (b) to a temperature sufficient to prevent sticking of the starting material or compacted material, thereby obtaining an annealed material; and (d) milling the annealed material of step (c) into a powder having a D50 particle size value from 20 to 100 microns, thereby obtaining a milled material.

A second aspect of the current invention is a particulate composition for additive manufacturing. According to a preferred embodiment of the second aspect, the particulate composition comprises, consists of, or consists essentially of a polyhydroxyalkanoate (PHA) powder, wherein the particulate composition and/or the PHA powder possesses (i) a free bulk density, as determined by ASTM D1895-96, of greater than 0.30 g/mL, and (ii) a sinterability region of greater than 15 degrees Celsius, wherein the sinterability region is determined by a value of $T_{i,m}$ minus $T_{f,c}$ per ISO 11357-1 (2009).

According to further preferred embodiments of the second aspect, the particulate composition is used as a build material for additive manufacturing sintering processes and is obtainable by a method according to any of the embodiments of the first aspect.

A third aspect of the current invention involves an additive manufacturing process comprising a particulate composition and/or PHA powder according to any of the embodiments of the second aspect of the invention, and/or any of the particulate compositions created by the processes described according to any of the embodiments of the first aspect.

According to a preferred embodiment of the third aspect, the process involves the steps of (a) providing a layer of a particulate composition for additive manufacturing comprising a PHA powder according to any of the embodiments of the second aspect; (b) optionally, selectively depositing a liquid composition onto the layer of the particulate composition, wherein at least one of the particulate composition or liquid composition comprises a fusing agent; (c) applying electromagnetic radiation to at least one of: (i) a specified location on the layer of the particulate composition, or (ii) a location at which the liquid composition which has been selectively deposited onto the particulate composition; wherein the particulate composition undergoes melting in at least some of the locations where the electromagnetic radiation and/or the liquid composition has been applied to form a fused section in accordance with computer data corresponding to a portion of a three-dimensional object to be formed; and (d) repeating steps (a), optionally (b), and (c) a plurality of times to form a fused three-dimensional object.

A fourth aspect of the current invention is an article printed via any of the processes described in the third aspect. Articles printed according to the fourth aspect are preferably derived from a particulate composition according to any of the embodiments of the second aspect, whereby the particulate composition is preferably derived via any of the embodiments described according to the first aspect of the invention.

BRIEF DESCRIPTION OF THE DRAWINGS

FIG. 1 depicts a DSC curve for a sample material, further showing thereon to facilitate the determination of various melting and crystallization points of the particular material.

DETAILED DESCRIPTION

The present invention is directed to providing biodegradable and/or compostable biobased powders with enhanced suitability for 3D printing. Herein described are methods of producing such powders as build material for additive manufacturing sintering processes, the build material produced therefrom, methods of using such build material in additive manufacturing processes, and the articles printed therefrom. Also described herein are certain particulate compositions for use in additive manufacturing processes comprising polyhydroxyalkanoate (PHA) powder, wherein the composition and/or powder is configured to possess certain novel characteristics which make it especially suitable for use in 3D printing processes. Yet further described are methods of conducting additive manufacturing processes utilizing the particulate compositions comprising the PHA powder also described, along with the articles produced therefrom.

A first aspect of the present invention is a method of manufacturing a particulate composition suitable as a powdered build material for additive manufacturing sintering processes comprising the steps of:

(a) providing a starting material comprising a homopolymer or copolymer of 3-hydroxy butyric acid;
(b) optionally, compacting the starting material with a compacting pressure of >40 kN thereby obtaining a compacted material;
(c) heating the starting material of step (a) or the compacted material of step (b) to a temperature sufficient to prevent sticking of the starting material or compacted material, thereby obtaining an annealed material; and
(d) milling the annealed material of step (c) into a powder having a D50 particle size value from 20 to 100 microns, thereby obtaining a milled material.

In embodiments of the first aspect, a starting material is provided. The starting material comprises a homopolymer or copolymer of 3-hydroxy butyric acid. 3-hydroxy butyric acid, also known as β-Hydroxybutyric acid, is an organic compound and a beta hydroxy acid with the chemical formula $CH_3CH(OH)CH_2CO_2H$; its conjugate base is β-hydroxybutyrate, also known as 3-hydroxybutyrate. β-Hydroxybutyric acid is a chiral compound with two enantiomers: D-β-hydroxybutyric acid and L-β-hydroxybutyric acid. Its oxidized and polymeric derivatives occur widely in nature. 3-hydroxy butyric acid is a precursor to poly(3-hydroxybutyrate) (P3HB), which is a biodegradable polyester. The chemical structure of P3HB is depicted below:

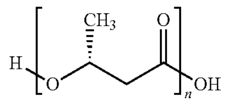

In a preferred embodiment, the starting material comprises, consists of, or consists essentially of a P3HB polymer. At standard temperature and pressure, the P3HB polymer may take any suitable form, such as a powder, flake, or granule. Of these, powders are preferred.

In various embodiments, the starting material comprises a (co)polymer of 3-hydroxy butyric acid and an additional acid. The additional acid may be of any suitable type which assures compatibility and biodegradability of the resultant polymer, but particularly preferred additional acids include 3-hydroxy hexanoic acid and 3-hydroxy valeric acid. As used herein, copolymers of 3-hydroxy butyric acid and 3-hydroxy hexanoic acid are referred to as "PHBH", whereas copolymers of 3-hydroxy butyric acid and 3-hydroxy valeric acid are referred to as "PHBV". Furthermore, as used herein, the general nomenclature for a homopolymer of 3-hydroxy butyric acid, or a copolymer of 3-hydroxy butyric acid with any additional acid(s) is referred to herein under the general nomenclature "PHBx".

If used, the comonomers may be incorporated in any quantity relative to each other as is desired, such as in an amount from 1 to 50 mol %, preferably 1 to 15 mol %.

Although P3HB occurs naturally, such as via the bacteria *Alcaligenes eutrophus*, it—along with other PHBx polymers—can also be produced synthetically. A known general such process for the production of PHBx involves the fermentation of a suitable bacteria in the presence of saccharose to yield a mixture. The resultant PHBx may then be isolated from the bacteria. At this stage, the PHBx possesses a typical particle size on the order of 0.25 to 1 micron. Most commercial processes next involve an agglomeration step, whereby the polymer is brought to an average particle size from 1 to 200 microns. Other processes for the synthesis of PHBx powders, flakes, or granules will be appreciated by the skilled person to which this invention relates.

The starting material according to various embodiments of the first aspect is subjected to a variety of processes to yield a suitable powdered build material for additive manufacturing sintering processes. According to certain embodiments, the starting material is compacted. Inventors have discovered that no heretofore known existing PHBx powders are sufficient to serve as suitable build material for additive manufacturing processes. Inventors have found that most are fluffy powders which do not yield optimal (or even sufficient) flowability, and even when they enable the building of printed parts, they may not enable the creation of printed objects with the requisite dimensional accuracy and precision needed for many end-use applications. Further, such powders do not facilitate the creation of objects with sufficient mechanical properties. As such, they may be used only in limited applications, such as for bone- or tissue-scaffolding.

As such, in some embodiments according to the first aspect, the starting material is first subjected to a compacting step. In a preferred embodiment, the compacting is carried out by any suitable apparatus for compacting such materials, including, for example a Bepex Labor Kompaktor. The force and/or pressure applied to the starting material may vary as desired, but in a preferred embodiment, the starting material is compacted with a specific linear force of at least 40 kilo newtons per centimeter (kN/cm), more preferably at least 80 kN/cm, more preferably at least 100 kN/cm, or between 40-400 kN/cm, or between 80-300 kN/cm, or between 100-25 kN/cm. Such compactions can be achieved between two rollers. In another embodiment, the compacting is carried out such that it imparts a pressure of greater than 5 $kN/cm^2$, more preferably greater than 25 $kN/cm^2$, more preferably greater than 40 $kN/cm^2$, or from 5-400 $kN/cm^2$, or from 25-300 $kN/cm^2$, or from 40-200 $kN/cm^2$ on the material. Inventors have surprisingly discovered that the beneficial effects of this compacting step remain with the starting material even after the subsequent downstream processes described elsewhere herein such that the resulting processed material possesses enhanced suitability for use in additive manufacturing applications.

According to some embodiments of the first aspect, the material compacted in the compacting step is next heated to produce an annealed material. Preferably, the heating step heats the compacted material to a temperature sufficient to prevent sticking of the compacted material. The heating process preferably involves annealing in the sense that the compacted material is heated up to some temperature below its glass transition temperature or peak melting temperature for a moderate period of time, after which it is allowed to cool again in order to reduce internal stresses therein.

The method of heating will differ according to several factors as will be appreciated by the skilled artisan to which this invention relates, including but not limited to the desired quantity of material to be heat-treated. Overarching common techniques involve batch and continuous heating. Batch heating typically involves forced convection in an oven, although for lab-scale quantities, other methods may be employed, such as the insertion of a flask containing the material into a hot oil bath under vacuum while purging with an inert gas or a tumble dryer. Continuous heating, meanwhile, typically involves passing the material along a conveyor in a heated tube or chamber. This method allows for less restricted air flow and is more suitable for industrial scale heating processes. Whether batch or continuous heating processes are utilized, other heating methods, such via the application of infrared radiation, may be employed as a substitute for the aforementioned convection heating.

Regardless of the general technique, the process will typically involve heating the material to a (i) desired temperature at a (ii) controlled rate, maintaining this desired temperature for (iii) a specified period of time, and then cooling the material at a (iv) controlled rate to a (v) final temperature. Any of (i)-(v) can vary as desired as will be appreciated by the skilled artisan, it being understood further that different PHBx polymers will necessitate varying conditions as they will possess intrinsically different material characteristics.

In various embodiments, however, (i) is selected as being up to 120° C., or 130° C., or 135° C., or 140° C., or 150° C., or 160° C., or 170° C. The ultimate desired temperature (i) should be selected so as not to exceed the peak melting temperature for the material being utilized, although it may at least briefly exceed material's melting point onset temperature ($T_m$, onset). In other embodiments, (i) may vary depending on the material, such as from 100 to 200° C., or from 120 to 180° C., or from 130 to 160° C.

Despite the ultimate heating temperature, a variety of (ii) heating rates may be selected, such as from 1° C./h to 100° C./h, or from 2° C./h to 25° C./h, more preferably 5° C./h to 10° C./h, although other rates may be employed as suitable. The rate of (ii) heating is not necessarily as important as (i) or (iii), provided that the material is heated evenly and does not exceed the peak melting temperature locally. Of course, it will be appreciated that a rapid heating is desired to minimize the overall processing time.

Furthermore, it is appreciated that the heating may occur continuously or in a step-wise processes; that is, the material may be heated to a certain intermediate value below the ultimate desired peak temperature (i), maintained there for a specified period of time, then ramped up further again as appropriate. This stepwise process may occur in the presence of two or more than two so-called intermediate desired temperatures with one, two, or more than two intermediate maintenance times in between.

Once the ultimate desired temperature (i) is achieved, the material may be maintained at such temperature for any specified length of time (iii). In an embodiment, (iii) is from 1 minute to 4 hours, or from 30 minutes to 2 hours.

Eventually, the material is preferably cooled from the desired temperature back down to an equilibrium temperature for use in processing the material further. This cooling can occur at any rate (iv), it being understood that the cooling may be continuous or in a stepwise fashion and might be under application of an $N_2$ atmosphere and/or under reduced pressure. The final equilibrium temperature (v), meanwhile, is preferably at or near ambient or room temperature.

In an embodiment, after the heating step, the method according to the first aspect of the invention involves the optional step of milling the annealed material to form an milled material with, i.a, a desired average particle size or particle size distribution. This step is necessary if the starting material is in the form of flakes, granules, or another powder with an average particle size that is larger than the desired end average particle size of the ultimate build material for the specified additive manufacturing process.

Regardless, the annealed material may be subjected to a milling or micronizing process to provide a particle size suitable for the intended printing process. The milling can be done at or around room temperature (e.g. 10 to 30° C.) but may be lower for other methods such as cryogenic milling. With cryogenic milling, or cryo-milling, the polymer is cooled down with liquid nitrogen (alternatives to $N_2$ include solid or liquid carbon dioxide) to prevent softening and clogging of the apparatus during milling. Physical filtering or sieving may then be performed to maintain particles below a desired maximum size.

Other well-known milling techniques include jet milling and mechanical milling. Jet milling processes, for example, grind materials by using a high-speed jet of compressed air or inert gas to impact particles into each other. Jet mills can be designed or used to output particles below a certain size, while continuously milling particles above that size, resulting in a narrow size distribution of the resulting product. Particles leaving the mill can be separated from the gas stream by cyclonic separation.

Milling techniques, especially mechanical milling, may be carried out in a pinned-disk mill, a fluidized-bed opposed jet mill, or a baffle-plate impact mill. Regardless of the milling technique and equipment used (all of which is well-known in the art to which this invention applies), the process should be carried out such that the resulting particle size distribution has a median particle size D50 is in the range from 1 to 650 microns, or more preferably from 1 to 400 microns, or for example, 10 to 200 microns, 20 to 100 microns, or 40 to 50 microns. Median particle size D50 may be determined via various methods, including TEM, SEM, dynamic light scattering, and static light scattering. A non-limiting example of a suitable device for measuring the particle size includes the LB-550 machine, which is available from Horiba Instruments, Inc., and which measures the particle diameter by dynamic light scattering. A preferred method for determining D50 median particle size is via laser diffraction particle size analysis in accordance with ISO 13320-1.

In a preferred embodiment, the annealed powder is milled to a particle size distribution with a D50 particle size in the range of 20 to 100 microns, or 30 to 90 microns, or 30 to 80 microns, or 40 to 90 microns, or 40 to 80 microns, or from 40 to 50 microns. A narrow particle size distribution having a mean particle at the sizes listed is desirable because it tends to improve the flowability of the ultimate powder created therefrom. This ensures superior processing and a reduction in agglomeration when such powder is used in powder-based additive manufacturing processes, such as multi-jet fusion or selective laser sintering.

In a preferred embodiment, the milling step comprises a jet milling or mechanical grinding process, wherein the jet milling or mechanical grinding process is carried out at a temperature of 15 to 35° C., or from 15 to 30° C.

After milling, the particles can be submitted to a post-treatment in a mixer with severe shear, preferably below the melting point onset temperature or glass transition temperature of the polymer in order to round the particles. Other further treatments of the particles in order to obtain the rounding of the particles for improved flow can be a fractionation step via sieving, sifting, or adding powder-flow aids. The rounding of the particles is advantageous because it facilitates the creation of particles with increased sphericity. This, in turn has a positive effect on the flow potential of the powder for maximized suitability in 3D printing applications.

According to other embodiments of the first aspect, the compacting step may not be required. In addition to the providing, compacting, heating, and milling steps, additional steps may be inserted as well. Such steps may be included before, between, or after any of the aforementioned steps as desired, and they may be performed once or more than once.

In an embodiment, the process according to the first aspect also involves the step of adding one or more compositional additives to the starting material, the compacted material, the annealed material, and/or the milled material. If an additive is included, the particulate composition will comprise both the product of the processed starting material (such as a homo- or copolymer of 3-hydroxy butyric acid) along with an additive component.

Such additives may be any suitable additive used for 3D printing without limitation, such as flame retardants, flow aids, fillers, pigments, and stabilizers. Suitable flow aids include fumed silicas, precipitated silicas; suitable fillers include glass particles and glass fibers (having a length of no more than 100 microns, but preferably less), glass beads, metal particles, and ceramic particles, suitable pigments include titanium dioxide, particles based on rutile, particles based on anatase, carbon black particles, carbon fibers; and stabilizers such as heat stabilizers and UV-stabilizers. If used, in an embodiment, one or more flow aids may be included in an amount from 0.05 to 20 wt. %, relative to the entire particulate composition.

The introduction of the additives can occur prior to the compacting step, between the compacting and heating steps, between the heating and milling steps, or after the milling step. The additives may be included in a dry blend or compounded into the starting material, compacted material, annealed material, and/or milled material as appropriate.

A variety of additional additives are known that can be incorporated into particulate compositions according to the present invention at one or more of the aforementioned process stages. Suitable additives to particulate compositions for additive manufacturing according to various embodiments of the invention include, for example, flow aids (other than the monomeric, oligomeric, or polymeric flow aids described elsewhere herein), fillers (including dispersed reinforcing materials such as chopped or milled glass fibers, chopped or milled carbon fibers, nano-fillers, clays, wollastonite and micas, as well as continuous reinforcing materials), pigments, processing aids (such as mold release agents), leveling agents, degassing agents, stabilizers (such as antioxidants and UV stabilizers), plasticizers, impact modifiers (core/shell rubbers), and carrier polymers.

Other examples of fillers which are known and commonly used in thermoplastic resin compositions include mineral fillers such as clay, mica, talc, and glass spheres or beads. Reinforcing fibers are for example glass fibers. An advantage of a resin composition comprising glass fibers is its increased strength and stiffness, particularly also at higher temperatures, which allows use at temperatures up to close to the melting point of the polymer in the associated composition.

Inorganic substances are especially suitable as fillers because of their tendency to impart water-resistance, heat-resistance, and robust mechanical properties into the composition. In an embodiment of the invention, the filler is inorganic and comprises ceramics such as silica ($SiO_2$) nanoparticles, i.e., those particles having a mean particle size of from between 1 nanometer (nm) to 999 nm, or between 5 nm-800 nm; or microparticles, i.e., those particles having a mean particle size of between 1 micrometer (μm) to 999 μm, or from 1-100 μm. Average particle size may be measured using a variety of techniques, such as scanning electron microscopy or laser diffraction particle size analysis in accordance with ISO13320-1. Please see U.S. Pat. No. 6,013,714 for further examples of silica nanoparticles.

In other embodiments of the invention, alternative inorganic filler substances may be used, such as those containing glass or metal particles. Certain non-limiting examples of such substances include: glass powder, alumina, alumina hydrate, magnesium oxide, magnesium hydroxide, barium sulfate, calcium sulfate, calcium carbonate, magnesium carbonate, silicate mineral, diatomaceous earth, silica sand, silica powder, oxidation titanium, aluminum powder, bronze, zinc powder, copper powder, lead powder, gold powder, silver dust, glass fiber, cellulose fibers, cellulose nanocrystals, titanic acid potassium whiskers, carbon whiskers, sapphire whiskers, verification rear whiskers, boron carbide whiskers, silicon carbide whiskers, and silicon nitride whiskers.

In an embodiment, however, a particulate composition according to the present invention is substantially devoid of any fillers at all. The absence of fillers may be beneficial because it ensures improved workability (i.e. flowability, surface finish) of the sintered products formed therefrom.

Suitable impact modifiers are rubber-like polymers that not only contain apolar monomers such as olefins, but also polar or reactive monomers such as, among others, acrylates and epoxide, acid or anhydride containing monomers. Examples include a copolymer of ethylene with (meth) acrylic acid or an ethylene/propylene copolymer functionalized with anhydride groups. The advantage of impact modifiers is that they do not only improve the impact strength of the resin composition but also contribute to an increase in viscosity. A suitable impact modifier is, for example, a maleic anhydride functionalized polyolefin.

Colorants, such as pigments or dyes, may optionally also be included in various embodiments. As colorants, for example, carbon black or nigrosine can be employed. EP2935430 describes various other common pigments, which may be used suitably herein, including titanium dioxide in one or more of its three crystalline forms (rutile, anatase, and brookite), ultramarine blue, iron oxides, bismuth vanadates, effect pigments including metallic pigments such as aluminum flake and pearlescent pigments such as micas, and organic pigments, for example phthalocyanines, perylenes, azo compounds, isoindolines, quinophthalones, diketopyrrolopyrroles, quinacridones, dioxazines, and indanthrones.

The particulate composition may additionally include one or more stabilizers. The presence of stabilizers is optional. Stabilizers are known per se and are intended to counter deterioration as a result of the effects of for example heat, light and radicals thereby formed. Known stabilizers that can be applied in the composition are for example hindered amine stabilizers, hindered phenols, phenolic antioxidants, copper salts and halogenides, preferably bromides and iodides, and mixtures of copper salts and halogenides, for example copper iodide/potassium iodide compositions and also phosphites, phosphonites, thioethers, substituted reorcinols, salicylates, benzotriazoles, hindered benzoates, and benzophenones. Preferably, the stabilizer is chosen from the group consisting of inorganic, hindered phenolic oxidant, hindered amine stabilizer and combinations thereof. More preferably, the stabilizers are a combination of inorganic stabilizer, a phenolic antioxidant and a hindered amine. In an embodiment, if the composition includes a stabilizer constituent, such constituent is present by weight, relative to the entire composition, from about 0.05 wt. % to about 2.0 wt. %, or from about 0.1 to 1.5 wt. %, or from 0.3 wt. % to 1.2 wt. %.

In an embodiment, the particulate composition also includes one or more lubricants. Such substances include long chain fatty acids, especially stearic acid or behenic acid, salts thereof, especially Ca or Zn stearate, as well as their ester derivatives or amide derivatives, in particular ethylene-bis-stearylamid, montan waxes and low molecular weight polyethylene or polypropylene waxes. In an embodiment, suitable lubricants include esters or amides of saturated or unsaturated aliphatic carboxylic acids having 8 to 40 carbon atoms with saturated aliphatic alcohols or amines having from 2 to 40 carbon atoms, and metal salts of saturated or unsaturated aliphatic carboxylic acids with 8 to 40 carbon atoms used with ethylene bis-stearyl amide, and calcium stearate.

The aforementioned lists of additives are not intended to be limiting, and any other suitable additive may be employed as is generally known to those of skill in the art to which this invention applies. Further such examples include UV stabilizers, gamma ray stabilizers, hydrolysis stabilizers, thermal stabilizers, antistatic agents, emulsifiers, nucleating agents, drip agents (such as polytetrafluoroethylene or polyvinylpyrrolidone), and plasticizers.

If included, the additives described herein may be used singly or in combinations of two or more, and may be compounded with, molecularly mixed, or dry blended with the particulate compositions suitable as a powdered build material for additive manufacturing according to the present invention. If additives are present at all, the particulate composition can comprise from 0.001 wt. % to 80 wt. %, or from 0.1 wt. % to 60 wt. %, or from 0.5 wt. % to 25 wt. % of additives, relative to the total weight of the particulate composition.

According to various non-limiting embodiments, the material may also be subjected to a filtering step. The filtering step may be conducted one or more times so as to select a subset of the particles, flakes, or granules contained in the material for further operation or use. This is typically achieved via sifting or sieving, and the apparatus for sifting and/or sieving may be selected with one or more screens or partitions so as to filter out particles above and/or below any specified size. In an embodiment, the starting material is sieved to assure that particles below 30 microns and above 100 microns are not maintained to any substantial degree. The filtration step may occur at any point or points along the process, but it is commonly carried out prior to the compacting step. Alternatively, it may be carried out before the heating step, after the heating step, before the milling step, after the milling step, or not performed at all. In an alternative embodiment, the filtration step is performed prior to or after more than one step in the process, or even prior to or after each step in the process. Preferably, the filtering step occurs as a final step to assure the end particulate composition is optimized for suitability as a powdered build material for use in additive manufacturing processes.

According to another embodiment the PHA of the PHA powder has a weight average molecular weight Mw, as determined by gel permeation chromatography against a polymethylmethacrylate standard with hexafluoroisopropanol (HFIP) as an eluent, of 200000 to 1000000 g/mol. The HFIP eluent may also comprise potassium trifluoroacetate, for example in an amount of 0.1 weight-%. The GPC analysis may be performed at temperatures above room temperature, for example at 35° C. Preferably the Mw is 350000 to 900000 g/mol and more preferred 380000 to 800000 g/mol. Such high molecular weights in the polymers can be obtained via biotechnological processes.

A second aspect of the present invention is a particulate composition for additive manufacturing, wherein the particulate composition is preferably obtainable via a method described above according to any of the embodiments of the first aspect of the invention. According to preferred embodiments of the second aspect, the particulate composition for additive manufacturing possesses a free bulk density above certain threshold values, and/or a sinterability region above a certain threshold value. A particularly preferred embodiment according to the second aspect is directed to a particulate composition for additive manufacturing which comprises, consists of, or consists essentially of a polyhydroxyalkanoate (PHA) powder, wherein the particulate composition and/or the PHA powder possesses:

(i) a free bulk density, as determined by ASTM D1895-96, of greater than 0.30 g/mL, and (ii) a sinterability region of greater than 15 degrees Celsius, wherein the sinterability region is determined by a value of $T_{i,m}$ minus $T_{f,c}$ per ISO 11357-1 (2009).

The PHAs useful according to the second aspect are polyesters which are able to be produced in nature by numerous microorganisms, including through bacterial fermentation of sugars or lipids. This class of biodegradable, bio-based polymers involves the inclusion of more than 150 different monomers which can be combined to yield materials with a wide range of properties. Such materials are described in, *Biopolymers*, Volume 4 (Polyesters III—Applications and Commercial Products); Doi, Yoshiharu; Steinbuchel, Alexander (2002); Weinheim, Germany: Wiley-VCH. (ISBN 978-3-527-30225-3).

Although PHA polymers encompass a greater number of species than the PHBx polymers elsewhere described herein, infra, a preferred subset of PHAs includes those in the PHBx group. Particularly preferred amongst PHAs useful as a powder include poly-3-hydroxybutyrate (P3HB), poly-4-hydroxybutyrate (P4HB), polyhydroxyvalerate (PHV), polyhydroxyhexanoate (PHH), polyhydroxyoctanoate (PHO), polyhydroxydecanoate (PHD), polyhydroxydodecanoate (PHDD), or copolymers thereof. Accordingly, in an embodiment, the PHA powder comprises, consists of, or consists essentially of P3HB, P4HB, PHV, PHH, PHO, PHD, PHDD, or any combination thereof. In a particularly preferred embodiment, the PHA powder comprises, consists of, or consists essentially of P3HB.

The PHA powder useful in the second aspect of the invention may be provided via a variety of processes and/or methods. Among these include non-limiting examples such as the general process for the synthesis of PHBx polymers as specified above, infra, as well as via the methods described in Biopolymers, to name a few.

The particulate compositions according to the second aspect may be provided alone or as a kit of materials, and they may include one or more additives. In embodiment, the PHA powder is dry blended with one or more additives to form the particulate composition. In another embodiment, the PHA powder and/or particulate composition is a polymer compound powder with other biopolymers (PLA, cellulose or starch based) or biomonomers. Beyond the PHA powder, the particulate composition itself may further include one or more additives to yield a particulate composition for additive manufacturing, as specified elsewhere herein, infra, with respect to the first aspect of the present invention. For the avoidance of doubt, such additives described with respect to the first aspect of the invention may be employed in the same amounts so described with respect to particulate compositions according to the second aspect as well.

Additives, including flame retardants, flow aids, fillers, pigments, stabilizers, and glass fillers, are common, and may be employed alone or in any combination as is exigent for the desired end-use application of the three-dimensional part created therefrom. Such additives may be incorporated or added at any of the stages or steps, and in any of the fashions described elsewhere herein as well, as will be appreciated by the skilled artisan.

In addition to the additives mentioned elsewhere herein, the non-PHA portion of the particulate composition may comprise, consist of, or consist essentially of other particulate polymers. In a preferred embodiment, the non-PHA portion of the particulate composition comprises, consists of, or consists essentially of polyester powders, such as polyethylene terephthalate (PETs), polybutylene terephthalate (PBTs), or copolymers thereof. Given that PHAs are also polyesters, in an embodiment the particulate composition comprises, consists of, or consists essentially of polyesters. Of course in the event that no additives or other polymers are included, the particulate composition according to the second aspect may comprise, consist of, or consist essentially of PHA powder(s). Accordingly, in other non-limiting embodiments, the polyester content in the particulate composition consists of or consists essentially of PHA, PHBx, PHBH, or P3HB, or combinations thereof.

As noted, the particulate composition and/or the PHA powder is configured to possess certain density values. Inventors have discovered that such particulate compositions and/or powders do not enable sufficient printability unless they possess requisite density values; most available powders possess a density that is too low to be suitable. The density of such materials may be increased via a number of means, preferably including the methods described elsewhere herein with respect to the compacting step of the first aspect of the present invention.

The density of particulate materials or powders may be measured in a number of different ways, but "apparent density" (which is otherwise known as "free bulk density" (FBD) and is referred to herein as such) and "tapped bulk density" (TBD) are two commonly-utilized methods. FBD is a measure of the density of an untapped powder sample, and is dependent upon both the inherent density of each particle, as well as the arrangement between particles. TBD, meanwhile, relies upon measurement only after mechanically tapping a receptacle containing a powder sample at a point until a further specified volume change is no longer observed. A non-limiting method for determining FBD and TBD is ASTM D1895-96 (2010), Test Method A.

In an embodiment, therefore, the FBD of the particulate composition is greater than 0.35 g/ml, or greater than 0.40 g/ml, or from 0.30 to 0.9 g/ml, or from 0.30 to 0.6 g/ml, or from 0.30 to 0.50 g/ml, or from 0.40 to 0.9 g/ml, or from 0.40 to 0.8 g/ml, or from 0.40 to 0.7 g/ml, or from 0.40 to 0.60 g/ml, or from 0.40 to 0.50 g/ml. In other embodiments, the TBD of the particulate composition is greater than 0.3 g/ml, or greater than 0.4 g/ml, or greater than 0.5 g/ml, or from 0.3 to 0.9 g/ml, or from 0.3 to 0.75 g/ml, or from 0.3 to 0.65 g/ml, or from 0.4 to 0.9 g/ml, or from 0.4 to 0.75 g/ml, or from 0.4 to 0.65 g/ml, or from 0.5 to 0.9 g/ml, or from 0.5 to 0.75 g/ml, or from 0.5 to 0.65 g/ml.

Due to the unique characteristics and quantities utilized of certain additives, however, the density of the particulate composition may be altered such that it may be more appropriate to measure the density only with respect to the PHA powder component alone. In another embodiment, therefore, the FBD of the PHA powder is greater than 0.40 g/ml, or from 0.30 to 0.6 g/ml, or from 0.30 to 0.50 g/ml, or from 0.40 to 0.7 g/ml, or from 0.40 to 0.60 g/ml, or from 0.40 to 0.50 g/ml. In yet other embodiments, the TBD of the PHA powder is greater than 0.3 g/ml, or greater than 0.4 g/ml, or greater than 0.5 g/ml, or from 0.3 to 0.9 g/ml, or from 0.3 to 0.75 g/ml, or from 0.3 to 0.65 g/ml, or from 0.4 to 0.9 g/ml, or from 0.4 to 0.75 g/ml, or from 0.4 to 0.65 g/ml, or from 0.5 to 0.9 g/ml, or from 0.5 to 0.75 g/ml, or from 0.5 to 0.65 g/ml.

If the density value becomes too high, on the other hand, the PHA powder will not possess sufficient flowability. Therefore, it is preferred that the FBD and/or the TBD of the particulate composition and/or PHA powder is less than 100 g/mL, more preferably less than 5 g/mL, or less than 1 g/mL.

In addition to possessing requisite density characteristics, in order to optimize suitability for use in additive manufacturing processes, the particulate compositions and/or PHAs according to the second aspect of the invention also preferably possess specified thermal characteristics. Commonly-described such characteristics of polymer powders are crystallization temperature ($T_c$) and melting point temperature ($T_m$). However, inventors posit that a powder's melting point onset temperature ($T_m$, onset) and crystallization onset temperature ($T_c$, onset) are more critical determinants for assessing its potential suitability for use in additive manufacturing processes. This is because the difference between these values, expressed mathematically herein as $\Delta T=(T_m$, onset$-T_c$, onset), represents the temperature region within which inventors surmise the powder will be suitable for use in additive manufacturing processes. A powder's $\Delta T$, referred to herein synonymously as its "sinterability region," must be maximized in order to ensure the powder will behave in a consistent fashion despite the natural temperature variabilities in the additive manufacturing process in which it is used. Powders of the present invention may exhibit larger windows of sinterability than conventional powders of the same type. In order to achieve this, powders of the present invention may also exhibit higher $T_m$, onset values. They may alternatively exhibit lower $T_c$, onset values. Further, they may simultaneously exhibit both higher $T_m$, onset values and lower $T_c$, onset values.

As used throughout this text, unless otherwise specified, the values for $T_m$, onset, along with $T_c$, onset, are determined by the method prescribed in ISO 11357-1 (2009). $T_m$, onset, which is referred to in the ISO 11357-1 method as $T_{i,m}$, is measured by determining the first detectable departure (such as 0.1 mW) of the curve from an extrapolated start baseline of the melting peak curve as the material to be evaluated is heated, as evidenced by differential scanning calorimetry (DSC) during the first heating cycle, at a constant heating rate of 10° C. per minute. $T_c$, onset is determined in related fashion per ISO 11357-1, and which is referred to therein as $T_{f,c}$, and represents the last detectable departure of the curve from an extrapolated end baseline of the crystallization peak curve of the material to be evaluated.

A hypothetical DSC curve having points of relevance as specified in ISO 11357-1 (2009) is depicted in FIG. 1. Turning to FIG. 1, the thermograph depicts the measured heat flow rate (also referred to as dQ/dt) on the y-axis with respect to the sample being evaluated as a function of temperature on the x-axis. Various points along this curve are represented by nomenclature which will be understood by the person having ordinary skill in the art upon referencing ISO 11357-1.

As used herein, the sinterability region of a material would be determined by subtracting the value of the temperature determined at $T_{i,m}$ (equivalently referred to herein as $T_c$, onset) from the value of the temperature determined at $T_{f,c}$ (equivalently referred to herein as $T_m$, onset).

Thus, the particulate composition and/or the PHA powder of the second aspect possesses specified sinterability regions. As stated previously, by maintaining a sinterability region which is higher than known analogous particulate compositions and/or PHA powders for additive manufacturing, powders of the current invention facilitate improved ease of use in the additive manufacturing process with which such particles are associated, such as selective laser sintering or multi-jet fusion processes. Furthermore, as stated, powders with a larger sinterability region will more readily yield the production of three-dimensional components with higher dimensional accuracy, less warpage, curl, and deformation, and with improved construction and homogeneity. It is believed that characterizing "sinterability region" as defined herein is a superior proxy to real-world usability than other methods which take points higher and lower on the melting and crystallization curves, respectively. This is because even though powder theoretically may continue to be operable at temperatures further along the melting curves, in practice some portion of applied powder may begin agglomeration even at these early phases along the melting point curve. Therefore, to ensure optimal printability, it would be helpful to know the precise regions within which the risk of any such agglomeration or powder degradation could be avoided to the maximum extent possible. Other methods, which ostensibly list a larger window of operability (such as taking the difference between $T_{ei,m}$ and $T_{ef,c}$ per ISO 11357-1), do not give a true indication of the range within which risk of part warpage or curl would be minimized. The various points germane to the foregoing are depicted in FIG. 1.

In an embodiment, therefore, the particulate composition of the second aspect possesses a sinterability region of at least 0 degrees C. Having such a value assures that there is no overlap between the point at which the particulate composition begins to melt and that at which it begins to crystallize. In a preferred embodiment, the particulate composition possesses a sinterability region of at least 15 degrees C., or at least 20, or at least 25, or at least 30, or at least 35 degrees C., or from 15-60, or from 15-45, or from 18 to 60, or from 18-45 degrees C.

Due to the unique characteristics and quantities utilized of certain additives, however, the sinterability region of an inhomogeneous particulate composition may be altered (or vary locally) such that it may be more appropriate to measure the density only with respect to the PHA powder component alone. In an embodiment, therefore, the PHA powder of the second aspect possesses a sinterability region of at least 0 degrees C. Having such a value assures that there is no overlap between the point at which the PHA powder begins to melt and that at which it begins to crystallize. In a preferred embodiment, the PHA powder possesses a sinterability region of at least 15 degrees C., or at least 20, or at least 25, or at least 30, or at least 35 degrees C., or from 15-60, or from 15-45, or from 18 to 60, or from 18-45 degrees C.

In still other embodiments, the sinterability region of the particulate composition and/or the PHA powder is from 15 to 50 degrees Celsius, or from 15-42° C., or from 18-42° C., or from 20-40° C., as determined by ISO 11357-1 (2009).

Inventors have surprisingly discovered that the thermal characteristics, and notably the sinterability region, of PHA powders, can improve dramatically via certain heat treatment methods. Preferably, the PHA powder and/or the particulate composition of the second aspect of the invention is subjected to the heating step (b) as described elsewhere herein, infra, with respect to the first aspect of the present invention. Inventors have demonstrated herein that certain processing of raw powder can improve its thermal characteristics such that suitability for use in additive manufacturing processes is obtained.

As mentioned, the physical properties among the different PHA polymers can vary significantly. Thus, there is no single preferred Tm, onset or Tc, onset value, it being understood that the sinterability region is generally of greater importance. Nonetheless, the PHA powder and/or particulate composition should be selected such that its aforementioned onset values are compatible within the operating limits of the additive manufacturing apparatus to be used therewith. In an embodiment, therefore, the Tm, onset value of the PHA is at least 100° C., or at least 120° C., or at least 125° C., or between 100-180° C., or between 120-150° C. Furthermore, in an embodiment, the PHA powder possesses a Tc, onset value of less than 135° C., or less than 125° C., or less than 110° C., or from 90-130° C., or from 95-125° C.

In still further embodiments, the PHA powder is configured to possess specified crystallinity characteristics. Crystallinity refers to the degree of structural order in a solid. For polymers, and particularly semi-crystalline polymers, the degree of crystallinity is a measure of the percentage of the volume of a particular substance that is in the crystalline, as opposed to the amorphous, state. The degree of crystallinity is known to influence many mechanical properties of a material, such as its hardness, density, and even thermal characteristics. The degree of crystallinity of a substance may be measured by a number of means, such as x-ray crystallography or calorimetric methods. In an embodiment, the PHA is possesses a degree of crystallinity of at least 10%, or at least 20%, or at least 30%, or at least 50%, or at least 60%, or at least 65%. In a preferred embodiment, the degree of crystallinity is determined via dividing an enthalpy change (ΔH) determined by a DSC method by a theoretical maximum value of 146 joules per gram (J/g).

To maximize suitability for use in various additive manufacturing processes, the particulate composition and/or the PHA powder of the second aspect desirably is configured to possess certain particle sizes and particle size distributions. It is known to those skilled in the art that specific particle size distributions may facilitate optimal processability and flowability in additive manufacturing processes. Therefore, in an embodiment according to the second aspect of the invention, the particulate composition and/or PHA powder possesses a D50 particle size in the range from 30 to 100 microns, or from 20 to 50 microns, or from 40 to 50 microns. Excessively small particles, such as those below about 20 microns, may inhibit the flowability of the powder particles. Conversely, depending upon the application requirements, the ultimate printed object resolution suffers if the particles tend to become too large, such as, for example, above 50 microns. Furthermore, particles that are too large also tend not to pack sufficiently, and therefore voids may be introduced into the objects fused therefrom.

For particle size distributions the median is called the D50 (or x50 when following certain ISO guidelines). The D50 is the size (specified herein in microns unless otherwise stated) that splits the distribution with half above and half below this diameter. As used in embodiments of the third aspect herein, the particle size distribution and D50 particle size are determined according by laser diffraction particle size analysis in accordance with ISO 13320-1. Other related terms correspond to the median value of other ways of analyzing a distribution of particles. The Dv50 (or Dv0.5), for instance, is the median for a volume distribution. Likewise, Dn50 is used for number distributions, and Ds50 is used for surface distributions. Since the primary result from laser diffraction is a volume distribution, the default D50 cited is the volume median and D50 typically refers to the Dv50 without including the "v." Similarly, other values like D10 and D90, which are also used herein, follow a similar nomenclature, and pertain to the $10^{th}$ and $90^{th}$ percentile of particle sizes by volume distribution, respectively.

In an embodiment, therefore, the particulate composition and/or the PHA powder possesses a D10 value of at least 15 microns, or at least 20 microns, or at least 30 microns, and/or a D90 value of less than 100 microns, or less than 90 microns, or less than 80 microns.

The particle sizes and/or particle size distributions may be tailored as needed via a variety of methods, including those described elsewhere herein with respect to the first aspect of the invention. Specifically, the filtering step (e) described with respect to the first aspect may be particularly useful for narrowing the particle size distribution, whereas the milling methods disclosed in step (c) above may be particularly useful at reducing the average particle size. Of course, it is contemplated that a combination of filtration and milling, among other methods, may be employed to engineer a particulate composition and/or PHA powder according to specific design requirements.

A third aspect of the current invention is an additive manufacturing process comprising a particulate composition and/or PHA powder according to any of the embodiments of the second aspect of the invention, and/or any of the particulate compositions suitable as a powdered build material for additive manufacturing processes according to any of the embodiments of the first aspect of the invention.

According to a preferred embodiment of the third aspect, the process involves the steps of (a) providing a layer of a particulate composition for additive manufacturing comprising a PHA powder according to any of the embodiments of the second aspect; (b) optionally, selectively depositing a liquid composition onto the layer of the particulate composition, wherein at least one of the particulate composition or liquid composition comprises a fusing agent; (c) applying electromagnetic radiation to at least one of: (i) a specified location on the layer of the particulate composition, or (ii) a location at which the liquid composition which has been selectively deposited onto the particulate composition; wherein the particulate composition undergoes melting in at least some of the locations where the electromagnetic radiation and/or the liquid composition has been applied to form a fused section in accordance with computer data corresponding to a portion of a three-dimensional object to be formed; and (d) repeating steps (a), optionally (b), and (c) a plurality of times to form a fused three-dimensional object.

The particulate compositions and/or PHA powders as defined in the present invention are particularly suitable for a variety of rapid prototyping/rapid manufacturing methods, including, but not limited to: selective laser sintering (SLS), powder/binder methods, and multi-jet fusion (MJF). In the SLS process, the polymer particles are introduced in a chamber and are selectively briefly exposed to a laser beam, and the particles impacted by the laser beam therefor melt. The molten particles coalesce and rapidly solidify again to give a solid mass. This process can produce three-dimensional structures simply and rapidly by constantly applying new layers and repeatedly exposing them to laser light to melt and subsequently coalesce in the form of the three-dimensional object.

Other additive manufacturing methods in which the particulate compositions and/or PHA powders of the present invention may be suitably incorporated are high speed sintering (HSS) and Multi jet fusion (MJF). Such methods utilize multiple jets that deposit successive layers of infrared absorbing fluids onto powder material, after which an exposure of energy, typically infrared energy, is applied to selectively melt the powder layer. Still another germane additive manufacturing process is electrophotography 3D-printing. This method employs a rotating photoconductor that builds the object layer-by-layer from the base.

Regardless of the specific process variant, each such 3D-printing method typically utilizes a similar arrangement of a moveable powder bed used for the production of the object. Furthermore, each process requires similar material performance of the powder being utilized therewith, because, despite the slightly differing heating mechanisms employed, similar stresses will be applied to the object being constructed in each case. Accordingly, in an embodiment, the particulate composition and/or PHA powder of any of the stated aspects of this invention are used in an SLS process, or an MJF process, or an HSS process, or a powder/binder process, or an electrophotography 3D printing process.

In an embodiment, the invention involves a method of forming a three-dimensional object comprising the steps of: forming a layer of a particulate composition according to any of the embodiments of the second aspects of the invention and/or a particulate composition created by any of the embodiments of the first aspect of the invention; selectively depositing a liquid composition onto the layer of the particulate composition in accordance with computer data corresponding to the shape of at least a portion of a three-dimensional object, wherein at least one of the particulate composition or liquid composition comprises a fusing agent; applying electromagnetic radiation to at least one location of the layer of the particulate composition where the liquid composition has been deposited, wherein the particulate composition undergoes melting in the at least one location; and repeating the aforementioned steps a plurality of times to form a three-dimensional object.

The methods according to the third aspect utilize a particulate composition as described in, or created by, any of the embodiments of any of the first or second aspects of the invention. Advantageously, the particulate compositions of the second aspect are created according to the methods according to the first aspect.

The formation of three-dimensional objects from the particulate composition may be facilitated or aided with the inclusion of additional materials. Such materials, which may be particulate solids or liquids, may be interspersed within the polymer powder, or may be deposited thereon, such as by selective jetting. Fusing agents, which are described in, i.a, WO2017196361A1, are a commonly-included example of additional materials which are used extensively in MJF or HSS processes. Fusing agents typically comprise, as an active ingredient, one or more energy absorbers, or components that are capable of absorbing electromagnetic radiation in order to produce heat. They may also include thermal and/or photo initiators. Such components may absorb electromagnetic radiation in the UV, UV-vis, visible, near-infrared, or infrared portions of the spectrum. When applied in selective locations, these fusing agents can impart melting only in the regions in which they have been applied and/or in which electromagnetic radiation has been applied to the polymer powder.

Non-limiting examples of fusing agents include pigments such as carbon black, tungsten bronzes, molybdenum bronzes, and metal nanoparticles, phosphates having a variety of counterions such as copper, zinc, iron, magnesium, calcium, and strontium, and the like, as well as silicates, especially those having the same or similar counterions as phosphates. Additionally, laser dyes and cyclic lactone dye precursors may be used. Near-infrared absorbing dyes may further be used, and include examples such as aluminium dyes, tetraaryldiamine dyes, cyanine dyes, pthalocyanine dyes, dithiolene dyes, and combinations thereof.

Additionally, conjugated polymers may be used as fusing agents. Examples of near-infrared absorbing conjugated polymers include poly(3,4-ethylenedioxythiophene)-poly (styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof.

The amount of fusing agent can vary depending on the component or components used. In an embodiment, the fusing agent can be from 0.1 wt. % to 20 wt. %. In one example, the concentration of energy absorber in the fusing agent can be from 0.1 wt. % to 15 wt. %. In another example, the concentration can be from 0.1 wt. % to 8 wt. %. In yet another example, the concentration can be from 0.5 wt. % to 2 wt. %. In a particular example, the concentration can be from 0.5 wt. % to 1.2 wt. %.

Fusing agents may also include one or more or initiator capable of initiating polymerization of the resin component. These initiators include thermal initiators and photoinitiators.

Thermal initiators include, without particular limitation, thermal free-radical polymerization initiators and peroxides. Examples of thermal free-radical polymerization initiators include, but are not limited to, azo compounds such as, for example, azo isobutyronitrile (AIBN), 1,1'-azobis(cyclohexanenitrile), 1,1'-azobis(2,4,4-trimethylpentane), C—C labile compounds, such as benzopinacole, peroxides, and mixtures thereof.

Examples of peroxides potentially suitable as thermal initiators include for example, percarbonates (of the formula OC(O)O), peroxyesters (of the formula C(O)OO), diacylperoxides, also known as peranhydride (of the formula C(O)OOC(O)), dialkylperoxides or perethers (of the formula —OO), hydroperoxides (of the formula —OOH), etc. The peroxides may also be oligomeric or polymeric in nature. Examples of organic peroxides are: tertiary alkyl hydroperoxides (such as, for instance, t-butyl hydroperoxide), other hydroperoxides (such as, for instance, cumene hydroperoxide), a ketone peroxide (perketones, being an addition product of hydrogen peroxide and a ketone, such as, for instance, methyl ethyl ketone peroxide, methyl isobutylketone peroxide and acetylacetone peroxide), peroxyesters or peracids (such as, for instance, t-butyl peresters, benzoyl peroxide, peracetates and perbenzoates, lauroyl peroxide, including (di)peroxyesters, perethers (such as, for instance, peroxy diethyl ether).

The thermal free-radical polymerization initiator may for example comprise a percarbonate, a perester or a peranhydride. Peranhydrides are for example benzoylperoxide (BPO) and lauroyl peroxide (commercially available as Laurox™). Peresters are for instance t-butyl per benzoate and 2-ethylhexyl perlaurate. Percarbonates are for example di-t-butylpercarbonate and di-2-ethylhexylpercarbonate or monopercarbonates.

Finally, photoinitiators for three-dimensional printing are also known, and are described in, i.a, U.S. Pat. No. 9,951,198.

The particulate compositions and fusing agents herein described may be present in one single composition/formulation, or they may be stored separately and applied to each other selectively during the additive manufacturing build process. Therefore, embodiments of the current invention are directed to a kit of materials, where the kit includes a combination of at least one of: (a) a particulate composition or PHA powder formed by or according to any of the embodiments of the first or second aspect as described elsewhere herein; and (b) a fusing agent, wherein the fusing agent further comprises an energy absorber, a thermal initiator, or a photoinitiator.

A fourth aspect of the current invention is an article printed via any of the processes described in the third aspect. Articles printed according to the fourth aspect are preferably derived from a particulate composition according to any of the embodiments of the second aspect, whereby the particulate composition is preferably derived via any of the embodiments described according to the first aspect of the invention. Such articles may be utilized in a variety of applications and/or markets, including prototyping, automotive, aerospace, medical, dental, lighting, electrical, and footwear to name a non-limiting few.

The following such examples further illustrate the invention but, of course, should not be construed as in any way limiting its scope.

EXAMPLES

The examples which follow are intended as an illustration of certain preferred embodiments of the invention, and no limitation of the invention is implied. Table 1 provides a summary of the performance of each example/comparative example, including a listing of D10/D50/D90 particle size (expressed in microns, or μm), the free bulk density (FBD) and tapped bulk density (TBD) (expressed in g/ml), the melting temperature ($T_m$), peak crystallization temperature ($T_c$), melting point onset temperature ($T_m$, onset), crystallization onset temperature ($T_c$, onset), sinterability region ($\Delta T$), melting enthalpy ($\Delta H$ in J/g), and degree of crystallinity (in %). Unless otherwise specified, all temperatures are expressed in degrees Celsius. The methods used for determining the foregoing measurements are specified below.

The means by which each particulate composition used in the examples herein was provided is further described below. Specifically, unless otherwise specified below (such as C8, which was a milled version of C7), the comparative examples 1 through 10 (C1-C10) were provided as-is from their supplier and were not processed further by the inventors. Further descriptive details of each such material is described below. Furthermore, the specific means by which particulate compositions used in examples 1-8 is described in further detail below.

Comparative Examples 1-10

C1 is a poly(3-hydroxybutyrate) (PHB) fluffy powder available commercially under the name Enmat Y3000, manufactured by TianAn Biologic Materials and supplied by HelianPolymers (NL). It was analyzed as shown in Table 1 below and denoted by the name “Enmat Y3000 fluff”.

C2 is a PHB fluffy powder available from Biomer Biopolyesters (DE). It was analyzed as shown in Table 1 below and denoted by the name “Biomer fluff”.

C3 is a poly(3-hydroxybutyrate co 3-hydroxyvalerate) (PHBV) fluffy powder available commercially under the name Enmat Y1000, manufactured by TianAn Biologic Materials and supplied by NaturePlast (FR). It was analyzed as shown in Table 1 below and denoted by the name “Enmat Y1000 fluff”.

C4 is a PHBV fluffy powder available under the tradename Ceraflour and supplied by Byk (NL). It was analyzed as shown in Table 1 below and denoted by the name “Ceraflour fluff”.

C5 is a poly(3-hydroxybutyrate co 3-hydroxyhexanoate) PHBH powder with a melting point of 144° C. and having the additional characteristics identified in Table 1 below. It is denoted in Table 1 by the name “PHBH powder 1”.

C6 is a PHBH powder with a melting point of 100° C. and having the additional characteristics identified in Table 1 below. It is denoted in Table 1 by the name “PHBH powder 2”.

C7 is a PHBH material provided in granule form with a melting point of 152° C. and having the additional characteristics identified in Table 1 below. It is denoted in Table 1 by the name “PHBH granulate”.

C8 is the PHBH granulate material of C7 that was cryogenically milled on a UPZ 100 Cryomill of Hosokawa at −40° C. and a pin disc speed of 20000 rpm. The obtained powder was sieved with a 125 um sieve to remove course particles. The final powder was analyzed as shown in Table 1 below and denoted by the name “C7 cryomilled”.

C9 is a PHBH material provided in granule form with a melting point of 146° C. and having the additional characteristics identified in Table 1 below. It is denoted in Table 1 by the name “PHBH granulate 2”.

C10 is a PHBH material provided in granule form with a melting point of 131° C. and having the additional characteristics identified in Table 1 below. It is denoted in Table 1 by the name “PHBH granulate 3”.

Examples 1-8

Example 1

Tablets of 0.4 cm diameter of PHB Y3000 were pressed from fluffy powder (the powder of C1) with a press mold at a force of 190 kN (equivalent to a pressure of 378 $kN/cm^2$ in such instance). Next, the tablets were milled to powder on a Retsch ZM1 apparatus equipped with a 1 mm sieve. The fraction of particles below 200 microns was isolated by sieving. The final particulate composition consisting of a PHB powder was analyzed as shown in Table 1 and denoted by the name “Compacted C1”.

Example 1a 3 grams of the final resulting powder as disclosed in example 1 above was inserted into a 25 ml round-bottomed flask and heated to 100° C. with electric heating while turning. The flask was put under vacuum pressure (1 mbar) and subsequently brought back to atmospheric pressure with $N_2$ to remove all air. This procedure was repeated 3 times. The temperature was raised to 145° C. and maintained at that temperature for 1 hour. After this, the temperature was increased to 155° C. for 1 hour and next to 165° C. for 1.5 hours. After the least step, the powder was cooled down. The final particulate composition consisting of a PHB powder was analyzed as shown in Table 1 and denoted by the name “Compacted/Annealed C1”.

Example 2

10 kg PHBV Ceraflour fluffy powder (the powder of C4) was compacted with a Bepex Labor Kompaktor L200/50 (roller width 5 cm) at a force of 40 kN. Since a compactor works with 2 rollers pressed to each other the specific linear press force can be calculated. This is the force divided by the roller width, resulting in 40/5=8 kN/cm. The rollers press the powder into the shape of pills with a cross section of 4.6*1 cm, next, the pills were crushed on a Retsch SM2000 apparatus equipped with an 8 mm sieve to flakes. The flakes were then mixed with the fresh fluffy powder of C4 in a weight ratio of 2:1 (flakes:C4 powder). This mixture was compacted again at a force of 110-120 kN (specific linear force 24 kN/cm). The obtained pills were first crushed with the SM2000 having the 8 mm sieve, and then again a second time with the 8 mm sieve having been exchanged with a 4 mm sieve. The final flakes were then milled to a powder with a Hosokawa ACM (Air Classifier Mill) and a sifter to remove the fines. The final particulate composition consisting of a PHBV powder was analyzed as shown in Table 1 and denoted by the name “Compacted C4”.

Example 3

2 kg of the final resulting powder as disclosed in example 2 above was inserted into a 10 liter round-bottomed flask and heated to 100° C. while turning in a hot oil bath. The flask was put under vacuum pressure (1 mbar) and subsequently brought back to atmospheric pressure with $N_2$ to remove all air. While purging with an $N_2$ flow of 7.2 liters per hour at atmospheric pressure, the temperature of the oil bath was heated to 145° C. and maintained at that temperature for 1 hour. After this, the temperature was increased stepwise to 150° C., 155° C., 160° C., 165° C. and ultimately to 168° C., whereby the temperature at each respective step was maintained for 1 hour before increasing the temperature further. After the least step, the powder was cooled down under the same $N_2$ flow by taken the flask out of the oil bath.

The final particulate composition consisting of a PHBV powder was analyzed as shown in Table 1 and denoted by the name “Compacted/Annealed C4”.

Example 4

First, 5 kg of the PHBH powder (of C5) was sieved over a 125 um sieve to remove the larger particles. Next, 2.7 kg of the filtered powder was put in a 10 liter round-bottomed flask and heated to 100° C. while turning in a hot oil bath. The flask was then put under vacuum pressure of 4 mbar while purging with $N_2$ at a flow of 8 liters per hour. After a 1½ hour drying phase, the temperature of the oil bath was heated to 115° C. and maintained at that temperature for 1 hour. After this, the temperature was increased stepwise to 120° C., 125° C., 130° C., and ultimately to 135° C., whereby the temperature at each respective step was maintained for 1 hour before increasing the temperature further. After the least step, the powder was cooled down under $N_2$ and vacuum by taken the flask out of the oil bath. The final particulate composition consisting of a PHBH powder was analyzed as shown in Table 1 and denoted by the name “Annealed C5”.

Example 5

First, 10 kg of the PHBH powder (of C5) was compacted with a Bepex Labor Kompaktor L200/50 at a pressure of 80 kN to pills of 10×30 mm with a 5 mm diameter. Next, the pills were crushed on a Retsch SM2000 apparatus equipped with an 8 mm sieve into flakes. After this, 3.8 kg of the resulting flakes were placed into a 10 liter round-bottomed flask and heated to 100° C. while turning in a hot oil bath. The flask was put under vacuum pressure of 1 mbar while purging with $N_2$ at a flow of 7.2 liters per hour. After a 1½ hour drying phase, the temperature of the oil bath was heated to 115° C. and maintained at that temperature for 1 hour. After this, the temperature was increased stepwise to 120° C., 125° C., 130° C., and ultimately to 135° C., whereby the temperature at each respective step was maintained for 1 hour before increasing the temperature further. After the least step, the powder was cooled down under $N_2$ and vacuum by taken the flask out of the oil bath.

The final flakes were milled to a powder with cryogenic mill equipped with a 100 μm screen. The final particulate composition consisting of a PHBH powder was analyzed as shown in Table 1 and denoted by the name “Compacted/Annealed C5”.

Example 6

For this example, 3.5 kg of the PHBH granulate material of C7 was placed in a 10 liter round-bottomed flask and heated to 105° C. while turning in a hot oil bath. The flask was placed under vacuum pressure of 1 mbar while purging with $N_2$ at a flow of 10 liters per hour. After a 1 hour drying phase, the temperature of the oil bath was heated to 110° C. and maintained at that temperature for an additional 1 hour. After this, the temperature was increased stepwise to 115° C., 120° C., 125° C., and 130° C., whereby the temperature at each aforementioned step was maintained for 1 hour before increasing the temperature further. After this, the temperature was raised one additional time to 135° C., whereupon this ultimate temperature was maintained for 2 hours. After the least step, the powder was cooled down under $N_2$ and vacuum by taken the flask out of the oil bath. The resulting annealed granules were milled to powder with ACM (Air Classifier Mill). The final particulate composition consisting of a PHBH powder was analyzed as shown in Table 1 and denoted by the name “Annealed C7”.

Example 7

3.7 kg of the PHBH granulate material of C9 was placed in a 10 liter round-bottomed flask and heated to 105° C. while turning in a hot oil bath. The flask was placed under vacuum pressure of 1 mbar while purging with $N_2$ at a flow of 7.2 liters per hour. After a 1½ hour drying phase, the temperature of the oil bath was heated to 100° C. and maintained at that temperature for 1 hour. After this, the temperature was increased stepwise to 110° C., 115° C., 120° C., 125° C., 130° C., and ultimately to 135° C., whereby the temperature at each respective step was maintained for 1 hour before increasing the temperature further. After the least step, the powder was cooled down under $N_2$ and vacuum by taken the flask out of the oil bath. The resulting annealed material was then milled to a powder with an ACM (Air Classifier Mill). The final particulate composition consisting of a PHBH powder was analyzed as shown in Table 1 and denoted by the name “Annealed C9”.

Example 8

110 g of the PHBH granulate of C10 was placed in a 250 ml round-bottomed flask and heated to 85° C. while turning in a hot oil bath. The flask was placed under vacuum pressure of 1 mbar while purging with $N_2$ at a flow of 7.2 liters per hour. The temperature of the oil bath was next heated to 130° C. stepwise in intermediate steps of 5° C., whereby the temperature was maintained for 20 minutes after each successive step temperature was achieved. After the specified steps, the temperature reached a temperature of 130° C. and was kept at that ultimate temp for an additional 100 min After the least step, the powder was cooled down under $N_2$ and vacuum by taken the flask out of the oil bath. The resulting annealed material was then cryogenically milled to a powder. The final particulate composition consisting of a PHBH powder was analyzed as shown in Table 1 and denoted by the name "Annealed C10".

D10/D50 D90 Particle Size

D10, D50, and D90 particle size values were measured in accordance with ISO 13320-1 as mentioned elsewhere herein. The Particle Size Distributions (PSD) of powders from which such values were derived were measured using Laser Diffraction on a SYMPATEC HELOS system (model HELOS/H3982) with a RODOS dry dispersion unit, R5 4.5-875 um. D50 represents the statistical volume median of the particle size, whereas D10/D90 represent the $10^{th}$ and $90^{th}$ percentile of such values, respectively. The values for the various samples were recorded and reported in Table 1 below. Values are reported in microns, unless otherwise noted.

Density

Free bulk density (FBD) or apparent density was measured in accordance with ASTM D1895-96. Herein described test method A was used. A cylindrical measuring cup having a volume of 100 ml and a diameter of 40 mm was coupled to a funnel with a 9.5 mm diameter opening at the bottom, whereby the funnel was mounted at a height of 38 mm above the measuring cup. The tapped bulk density (TBD) was determined by putting the cup on a vibrating plate with an amplitude of 0.2 mm till the volume stayed constant. Values for each composition are reported in Table 1 below in units of grams per milliliter (g/ml).

$T_m$, $T_c$, $T_m$, Onset, $T_c$, Onset, and Sinterability Region $T_m$, $T_m$, $T_c$, $T_m$, onset, $T_c$, onset, and Sinterability Region were determined via differential scanning calorimetry (DSC). The DSC measurements were performed on a Mettler DSC823e equipped with a FS0812R0 sample robot and Mettler TS0800GC1 gas control. All samples were recorded in sealed aluminum pans. The calibration of the DSC instruments was carried out with indium. Then, the DSC thermograms of the materials (in amounts from 3 to 10 mg) were recorded at a scanning rate of 10° C. per minute, with a temperature range from 25° C. to a temperature of 15° C. (±5° C.) above the $T_{f,m}$. After reaching the maximum temperature the temperature was kept constant for 1 min before cooling down to 25° C. at a scanning rate of 10° C. per minute. The data collection was carried out using STARe software.

Values for $T_m$, $T_c$, $T_m$, onset, $T_c$, onset, and Sinterability Region were then determined with the DSC thermographs in accordance with ISO 11357-3 (2009). First, $T_{i,m}$ was determined by taking the first detectable departure of the curve from an extrapolated start baseline of the melting peak curve as the sample to be evaluated was heated, as evidenced by a DSC method during the first heating cycle, at a constant heating rate of 10° C. per minute. Furthermore, "the first detectable departure of curve from extrapolated start baseline" was defined as the point at which the thermograph illustrated at least a 0.15 mW deviation from the baseline. The values for $T_{i,m}$ derived from this ISO method were recorded and are reported in Table 1 as $T_m$, onset.

$T_{f,c}$, meanwhile, was then determined per the same ISO method, which represented the last detectable departure of the curve from an extrapolated end baseline of the crystallization peak curve of the material to be evaluated, wherein "last detectable departure" was defined as the point at which the deviation from the baseline became less than 0.1 mW. The values for $T_{f,c}$ derived from this ISO method were recorded and are reported in Table 1 as $T_c$, onset.

In similar fashion, $T_m$ and $T_e$ were determined per the same ISO method as designated by $T_{p,m}$ and $T_{p,c}$ therein, respectively. These values are also reported in Table 1, below.

Finally, the sinterability region was determined by subtracting the value, on a sample-by-sample basis, of $T_c$, onset from $T_m$, onset, or from ISO 11357-3, $T_{i,m}$-$T_{f,c}$. The values are reported in Table 1 below under the column headed by "ΔT".

All values for $T_m$, $T_m$, onset, $T_c$, $T_c$, onset, and sinterability region as reported herein are expressed in degrees Celsius (° C.), unless otherwise noted.

GPC

The number average molecular mass (Mn) and weight average molecular mass (Mw) were determined by gel permeation chromatography (GPC) with a polymethylmethacrylate standard in a solution of hexafluoroisopropanol (HFIP) and 0.1 wt. % of potassium trifluoroacetate at 35° C. The separation columns used were provided by Polymer Standards Service GmbH (Germany). Three model PFG Linear XL 7 μm, 300×8.0 mm columns (particles size: 7 um) with pre-column were then applied. The GPC analysis was performed using Viscotek GPC Max (System ID: LT-8) equipped with Viscotek Triple Detector Array 305, including ultra-violet (UV), refractive index (RI), differential viscometer (DV) and right-angle light-scattering (RALS) detector. Finally, the data acquisition and calculations were performed using Malvern OmniSEC 4.7.0 software.

TABLE 1

| Exp | PHA type | Material | D10 μm | D50 μm | D90 μm | FBD g/ml | TBD g/ml | Tm ° C. | Tc ° C. | $T_m$, onset ° C. | $T_c$, onset ° C. | ΔT ° C. | ΔH J/g | Crys % |
|---|---|---|---|---|---|---|---|---|---|---|---|---|---|---|
| C1 | PHB | Enmat Y3000 fluff | 5 | 46 | 199 | 0.20 | 0.25 | 175 | 100 | 146 | 122 | 24 | 72 | 49 |
| C2 | PHB | Biomer fluff | 2 | 28 | 220 | — | 0.21 | 177 | 83 | 132 | 106 | 26 | | |
| C3 | PHBV | Enmat Y1000 fluff | 3 | 321 | 145 | — | 0.20 | 173 | 84 | 138 | 106 | 32 | 80 | 55 |
| C4 | PHBV | Ceraflour fluff | 2 | 16 | 128 | — | 0.18 | 173 | 81 | 132 | 102 | 30 | | |
| C5 | PHBH | PHBH | 25 | 85 | 134 | 0.43 | 0.51 | 144 | 95 | 90 | 105 | <0 | 51 | 35 |
| C6 | PHBH | PHBH 2 | 48 | 86 | 133 | 0.40 | 0.47 | 100 | 69 | 42 | 115 | <0 | 38 | 26 |
| C7 | PHBH | PHBH granulate | — | — | — | — | — | 152 | 97 | 90 | 117 | <0 | 54 | 37 |

TABLE 1-continued

| Exp | PHA type | Material | D10 µm | D50 µm | D90 µm | FBD g/ml | TBD g/ml | Tm ° C. | Tc ° C. | $T_m$, onset ° C. | $T_c$, onset ° C. | ΔT ° C. | ΔH J/g | Crys % |
|---|---|---|---|---|---|---|---|---|---|---|---|---|---|---|
| C8 | PHBH | C7 cryomilled | 34 | 80 | 147 | 0.38 | 0.49 | 145 | 94 | 82 | 105 | <0 | 63 | 43 |
| C9 | PHBH | PHBH granulate 2 | — | — | — | — | — | 146 | 89 | 86 | 100 | <0 | 58 | 40 |
| C10 | PHBH | PHBH granulate 3 | — | — | — | — | — | 114 | 82 | 75 | 122 | <0 | 45 | 30 |
| 1 | PHB | Compacted C1 | 15 | 66 | 144 | 0.36 | 0.47 | 176 | 102 | 143 | 116 | 27 | 100 | 67 |
| 1a | PHB | Compacted/Annealed C1 | 27 | 83 | 165 | nd | nd | 180 | 102 | 150 | 116 | 34 | 127 | 85 |
| 2 | PHBV | Compacted C4 | 25 | 57 | 111 | 0.42 | 0.54 | 174 | 107 | 136 | 118 | 18 | 90 | 62 |
| 3 | PHBV | Compacted/Annealed C4 | 29 | 59 | 110 | nd | nd | 178 | 106 | 158 | 117 | 41 | 100 | 68 |
| 4 | PHBH | Annealed C5 | 48 | 91 | 140 | 0.44 | 0.53 | 132 | 100 | 128 | 108 | 20 | 49 | 34 |
| 5 | PHBH | Compacted/Annealed C5 | 17 | 56 | 118 | 0.46 | 0.61 | 135 | 96 | 121 | 105 | 16 | 46 | 32 |
| 6 | PHBH | Annealed C7 | 26 | 65 | 127 | 0.46 | 0.59 | 133 | 98 | 125 | 106 | 19 | 53 | 36 |
| 7 | PHBH | Annealed C9 | 29 | 69 | 130 | 0.48 | 0.62 | 142 | 92 | 121 | 99 | 21 | 43 | 30 |
| 8 | PHBH | Annealed C10 | 36 | 96 | 182 | 0.37 | 0.47 | 131 | 85 | 129 | 96 | 33 | 9 | 6 |

nd = not determined, but densities are similar to Exp 1 or 2 (after the annealing the PSD did not change so it is not expected that the densities have changed)

TABLE 2

| GPC data | | | | |
|---|---|---|---|---|
| Exp | PHA type | Material | Mn (Da) | Mw (Da) |
| C1 | PHB | Enmat Y3000 fluff | — | — |
| C2 | PHB | Biomer fluff | — | — |
| C3 | PHBV | Enmat Y1000 fluff | — | — |
| C4 | PHBV | Ceraflour fluff | — | — |
| C5 | PHBH | PHBH | 267000 | 680000 |
| C6 | PHBH | PHBH 2 | — | — |
| C7 | PHBH | PHBH granulate | — | — |
| C8 | PHBH | C7 cryomilled | — | — |
| C9 | PHBH | PHBH granulate 2 | — | — |
| C10 | PHBH | PHBH granulate 3 | — | — |
| 1 | PHB | Compacted C1 | 154000 | 710000 |
| 2 | PHBV | Compacted C4 | 141000 | 389000 |
| 3 | PHBV | Compacted/Annealed C4 | 136000 | 387000 |
| 4 | PHBH | Annealed C5 | nd | nd |
| 5 | PHBH | Compacted/Annealed C5 | 207000 | 564000 |
| 6 | PHBH | Annealed C7 | 131000 | 327000 |
| 7 | PHBH | Annealed C9 | 129000 | 315000 |
| 8 | PHBH | Annealed C10 | 168000 | 524000 |

nd = not determined, but MW data are similar to Exp 5 (by compacting the MW data are not expected to change)

Unless otherwise specified, the term wt. % means the amount by mass of a particular constituent relative to the entire composition into which it is incorporated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventor for carrying out the invention. Variations of those preferred embodiments may become apparent to those of ordinary skill in the art upon reading the foregoing description. The inventor expects skilled artisans to employ such variations as appropriate, and the inventor intends for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A particulate composition for additive manufacturing comprising or consisting of, a polyhydroxyalkanoate (PHA) powder, wherein the PHA powder comprises or consists of poly-3-hydroxybutyrate (P3HB), poly-4-hydroxybutyrate (P4HB), polyhydroxyvalerate (PHV), polyhydroxyhexanoate (PHH), or copolymers thereof, and wherein the PHA powder possesses a. a free bulk density, as determined by ASTM D1895-96, of greater than 0.30 g/mL, and b. a sinterability region of greater than 15 degrees Celsius, wherein the sinterability region is determined by a value of $T_{i,m}$ minus $T_{f,c}$ per ISO 11357-1 (2009).

2. The particulate composition according to claim 1, wherein the PHA powder possesses a degree of crystallinity above 30%, wherein the degree of crystallinity is determined via dividing the melting enthalpy (ΔH) determined by a DSC method by a theoretical maximum value of 146 joules per gram (J/g).

3. The particulate composition according to claim 1, wherein the sinterability region of the particulate composition and/or the PHA powder is from 15 to 50 degrees Celsius, as determined by ISO 11357-1 (2009).

4. The particulate composition according to claim 1, wherein the PHA powder possesses a free bulk density from 0.3-0.65 g/mL.

5. The particulate composition according to claim 1, wherein the particulate composition and the PHA powder consists of polyhydroxyalkanoates (PHAs).

6. The particulate composition according to claim 1, wherein the particulate composition and/or the PHA powder further comprises or consists of, poly-3-hydroxybutyrate (P3HB), poly-4-hydroxybutyrate (P4HB), or copolymers thereof.

7. The particulate composition according to claim 1, wherein the particulate composition and/or the PHA powder comprises or consists of, P3HB.

8. The particulate composition according to claim 1, wherein the particulate composition and/or the PHA powder possesses a D50 particle size from 30 to 100 microns.

9. The particulate composition according to claim 1, wherein the particulate composition and/or the PHA powder possesses a D90 particle size of 100 microns or less, and a D10 particle size of at least 30 microns.

10. The particulate composition according to claim 1, wherein the PHA powder possesses a Tm, onset value of at least 100° C.

11. The particulate composition according to claim 1, wherein the PHA powder possesses a Tc, onset value of less than 135° C.

12. The particulate composition according to claim 1, wherein the particulate composition further comprises one or more additives, wherein the additives comprise one or more flow aids and are present in an amount by weight, relative to the entire particulate composition, in an amount from 0.5 wt. % to 20 wt. %.

13. The particulate composition of claim 12, wherein the one or more flow aids comprise fumed silica and/or precipitated silica.

14. The particulate composition according to claim 1, wherein the PHA of the PHA powder has a weight average molecular weight Mw, as determined by gel permeation chromatography against a polymethylmethacrylate standard with hexafluoroisopropanol (HFIP) as an eluent, of 200000 to 1000000 g/mol.

15. A method of forming an object via an additive manufacturing process comprising the steps of:
(a) providing a layer of a particulate composition for additive manufacturing comprising a PHA powder according to claim 1;
(b) optionally, selectively depositing a liquid composition onto the layer of the particulate composition, wherein at least one of the particulate composition or liquid composition comprises a fusing agent;
(c) applying electromagnetic radiation to at least one of:
(i) a specified location on the layer of the particulate composition, or
(ii) a location at which the liquid composition has been selectively deposited onto the particulate composition at step (b);
wherein the particulate composition undergoes melting in at least some of the locations where the electromagnetic radiation and/or the liquid composition has been applied to form a fused section in accordance with computer data corresponding to a portion of a three-dimensional object to be formed; and
(d) repeating steps (a), optionally (b), and (c) a plurality of times to form a fused three-dimensional object.

16. The method according to claim 15, wherein the PHA powder possesses a $T_m$, onset value of at least 100° C.

17. The method according to claim 15, wherein the particulate composition and/or the PHA powder comprises, or consists of, P3HB, and wherein the PHA powder possesses a free bulk density from 0.3-0.65 g/mL.

18. The method according to claim 15, wherein the particulate composition further comprises one or more additives, and wherein the one or more additives comprise one or more flow aids present in an amount by weight, relative to the entire particulate composition, from 0.5 wt. % to 20 wt. %.

19. The particulate composition of claim 1, wherein the particulate composition and/or the PHA powder comprises or consists of P3HB, and wherein the PHA powder possesses a free bulk density from 0.3-0.65 g/mL.

20. The particulate composition according to claim 19, wherein the particulate composition further comprise one or more additives, and wherein the one or more additives comprise one or more flow aids present in an amount by weight, relative to the entire particulate composition, from 0.5 wt. % to 20 wt. %, and wherein the one or more flow aids comprise fumed silica and/or precipitated silica.

21. The particulate composition according to claim 1, wherein the PHA powder possesses a $T_m$, onset value of at least 100° C.

22. The particulate composition according to claim 1, wherein the particulate composition further comprises one or more additives, and wherein the one or more additives comprise one or more flow aids present in an amount by weight, relative to the entire particulate composition, from 0.5 wt. % to 20 wt. %, and wherein the one or more flow aids comprise fumed silica and/or precipitated silica.

23. The particulate composition according to claim 22, wherein the one or more additives further comprise carbon black particles.

* * * * *